May 2, 1939.  J. H. VAN UUM  2,156,670
SPRING CLIP DEVICE
Filed May 28, 1937

INVENTOR.
JOHN H. VAN UUM
BY
ATTORNEY.

Patented May 2, 1939

2,156,670

UNITED STATES PATENT OFFICE 2,156,670

SPRING CLIP DEVICE

John H. Van Uum, Lakewood, Ohio

Application May 28, 1937, Serial No. 145,335

6 Claims. (Cl. 85—5)

This invention relates to spring clip fasteners and particularly to a spring clip fastener for securing very light metal trim members to apertured supports.

In automobile body manufacture, the gauge of material of the trim members such as bead trim has gradually been reduced, and quite often softer metals have been used than previously employed, with the result that when attempts are made to snap the bead trim onto pre-installed clips in the support or body, there is a tendency for the flanges of the trim to become bent and distorted under the pressure necessary for its installation. As a result, many times the bead trim and clip will not be properly engaged with each other and often, due to such distortion of the flanges by the clip, it is necessary to remove the entire trim and the clips and reinstall the same, employing a new trim member.

The principal object of the present invention is to provide a spring clip which may be installed in an apertured support and onto which a bead trim member may be snapped thereafter, and in which the trim engaging portions of the clip are such as to operate properly with pressure sufficiently light that danger of distortion of the bead trim and flanges is substantially eliminated.

Another object is to accomplish this result with a clip which securely interengages with the support which interengagement, of necessity, requires a much stronger clip structure and much greater pressure for installation than the part which is received in the trim.

A more specific object, therefore, is to provide a clip having a trim engaging portion which will readily engage the soft thin metal of the trim without distortion thereof and without a sacrifice in the gripping effect between the clip and the support.

Other objects and advantages will become apparent from the following specification wherein reference is made to the drawing, in which.

Figure 1:
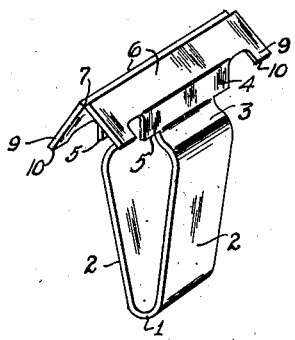
Fig. 1 is a perspective view of a clip embodying the principles of the present invention.
Figure 2:
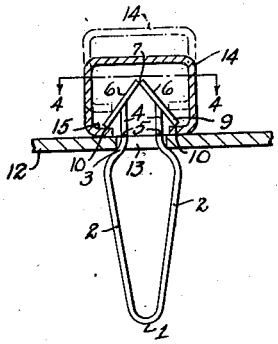
Fig. 2 is an end elevation of the clip connecting a bead trim member to a support, the trim member and support being shown in section for clearness in illustration.
Figure 3:
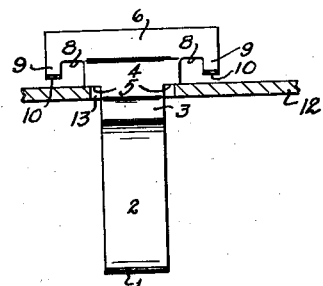
Fig. 3 is a side elevation of the structure illustrated in Fig. 2.
Figure 4:
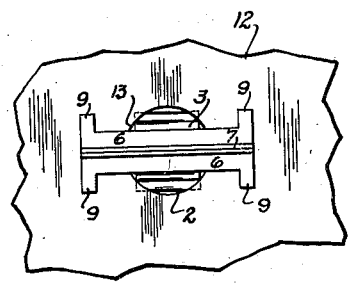
Fig. 4 is a view of the structure illustrated in Fig. 2 and is taken on a plane indicated by the line 4—4 thereof.
Figure 5:
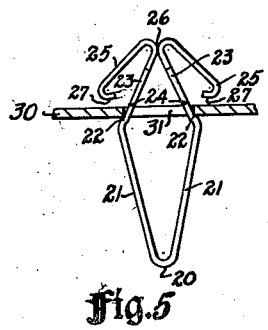
Fig. 5 is a side elevation of a modified form of the clip mounted in the supporting structure, which is shown in section for clearness in illustration.
Figure 6:
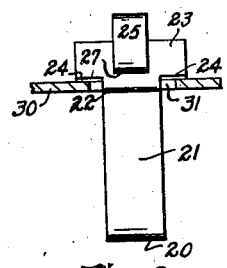
Fig. 6 is a side elevation of the installed clip illustrated in Fig. 5.

Referring first to Figs. 1 to 4, inclusive, the clip comprises a piece of spring metal bent intermediate its ends to provide a portion in the form of a nose 1, with spaced legs 2 divergent therefrom partway of their length and convergent therebeyond to form locking shoulders 3 which are engageable with the inner face of the support with which the clip is to be associated.

Beyond the locking shoulders 3 are widened portions 4, the lower edges of which provide lands 5 which are engageable with the outer face of the support when the clip is installed for spacing the trim engaging portions of the clip a proper distance from the supporting structure.

On the upper or free ends of the widened portions 4 are convergent head portions 6 which abut at their upper edges, as indicated at 7, and thereby provided with the legs 2, in operative effect, a closed spring loop for retaining the full spring effect of the strip in condition for use in securing the clip to the support. The head portions 6 are considerably wider than the portions 4 and near their end margins are notches, as indicated at 8, to provide relatively thin depending locking lugs 9 arranged one at each lower corner of the head portions 6. The locking lugs 9 are of such length that their lower edges are in spaced relation to the support when the lands 5 are in engagement with the outer face of the support so that their lower edges provide locking shoulders 10 for engagement with the inner faces of the bead trim member. The lugs 9 are bent outwardly from the plane of the head portions a slight amount so that the bead trim member may be placed in engagement therewith while the bead trim member is out of contact with the remainder of the head portions 6.

The clip is connected to a support 12 by insertion nose foremost through an aperture 13 therein. In the installed position the land shoulders 5 engage the outer face of the support when the shoulders 3 firmly engage the inner face thereof. A bead trim 14 having inturned flanges 15 defining an opening in one face thereof, is shown as an element to be supported and is placed in the position indicated by dot and dash lines in Fig. 2 preparatory to installation. In this position the head portions 7 extend longitudinally of the trim member.

In this position the bead trim member 14 is pressed downwardly with light pressure so that the flanges 15 thereof flex the lugs 9 inwardly toward the head portions until they pass below the locking shoulders or edges 10, whereupon the lugs reflex so that the edges 10 rest upon the inner surface of the flanges 15.

Due to the closed spring loop effect and width of the legs and lands 5, firm gripping relation of the clip in the support is maintained while, at the same time, due to the relatively thin locking lugs 9, only slight pressure is required for snapping the bead trim in place. Since the stresses for flexing the legs 5 and lugs 9 are segregated, the lugs 9 may be made in such width and lightness that they cannot damage or bend the bead trim when it is pressed thereagainst. Once the trim is locked to the clip, however, any outward pull on the trim would necessitate bending the lugs 9 outwardly farther from the planes of the associated head portions and since their angular disposition relative to the head portions is only slight, a considerable pressure would be necessary to cause them to yield outwardly.

Figure 7:
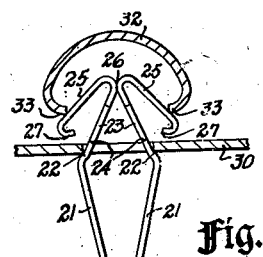
Figs. 7 and 8 are side elevations of the clip with the support and bead trim member shown in section, the bead trim member being shown in different positions of installation.
Figure 8:
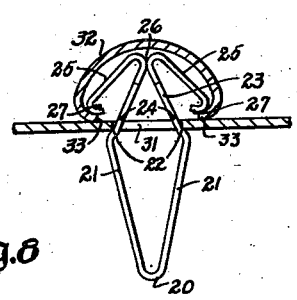
Figure 9:
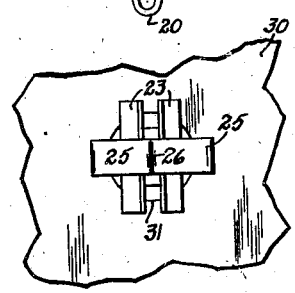
Fig. 9 is a top plan view of the clip and support illustrated in Fig. 5.

In the modified form of the invention illustrated in Figs. 5 to 9, inclusive, a clip having similar characteristics as to the support engaging portion but with slightly modified head portions is illustrated. The modified clip comprises a strip of metal having a nose 20 with divergent legs 21, locking shoulders 22, and widened portions 23 beyond the locking shoulders to provide lands 24 corresponding in form and function to the shoulders or lands 5, heretofore described. Beyond the widened portions 23, the width of the strip is considerably reduced to provide reduced locking lugs 25 which abut each other as at 26 just above the widened portions 23 and then slope downwardly and outwardly. The lower or free end portions of the locking lugs 25 are then bent inwardly to provide locking shoulders 27 for engagement with the inturned flanges of the bead trim. The locking shoulders 27 are spaced the proper distance from the outer surface of the supporting structure by the lands 24. The clip is shown as installed in a support 30 through an aperture 31, and after such installation, is ready to receive a bead trim member 32 having inturned flanges 33. The bead trim member is placed on the locking lugs 25 of the clip as illustrated in Fig. 7 and then pressed toward the support, the lugs flexing inwardly during such movement of the bead trim member until the shoulders 27 pass relatively beyond the flanges 33. Thereupon the lugs reflux and dispose the shoulders 27 in firm overlying relation to the flanges 33. Due to the abutment of the portions 26 any attempt to remove the bead trim by pulling thereon away from the support would necessitate spreading of the lugs by swinging movement outwardly about the point of abutment. The lugs, however, have a total length greater than the overall width of the trim member so that such attempted removal can result only in firmer gripping of the bead trim by the clip. Thus though the trim may be readily snapped into space on the head portions of the clip it is fixedly anchored after installation and can be pulled loose only by actual destruction of the trim member or the clip itself, so long as the clip retains its position in the support.

Obviously positive interlocking of the leg portions of the clips with the support may be provided, such as described in my co-pending application, Ser. No. 145,332, filed May 28, 1937, and when combined with the head portions herein described, a positive lock of the bead trim to the clip and thereby to the support may readily be provided.

Having thus described my invention, I claim:

1. A spring clip for securing to an apertured support a hollow trim member having an opening in one face with inturned flanges therealong and comprising a single piece of spring metal having a portion in the form of a shank arranged for reception, upon flexure, through an aperture in the support and having locking shoulders arranged to engage with the inner face of the support when the clip is installed, and having widened portions in the form of lands adapted for engagement with the outer surface of the support on which the clip is to be installed to position the clip in proper relation thereto when the clip is installed, and having relatively narrow locking lugs extending from the said widened portions toward the shank and of such length as to terminate in spaced relation to the outer surface of the support on which the clip is to be installed when the lands are in engagement with the outer face of the support, and said lugs being adapted to flex relatively toward each other for entering through the opening in the trim member when the trim member is pressed thereonto lightly and adapted to reflex within the member, when the trim member is installed, and to engage the inner faces of the flanges to secure the member to the support.

2. A spring clip for securing to an apertured support a hollow trim member having an opening in one face with inturned flanges therealong, and comprising a single piece of spring metal having a portion intermediate its ends in the form of a nose and having portions in the form of legs divergent therefrom partway of their length and convergent therebeyond in the form of locking shoulders, whereby said clip may be received, nose foremost, through an aperture in the support and the locking shoulders placed in engagement with the inner face of the support, and said clip having portions widened laterally of the legs in the forms of lands, and the lands being arranged to engage the outer face of the support when the clip is installed and the locking shoulders are in engagement with the inner face of the support, whereby the clip is positioned in proper relation to the outer face of the support, and said clip having relatively narrow locking lugs extending from the said widened portions toward the shank and arranged to terminate in spaced relation to the outer surface of the support when the clip is installed and the lands are in engagement with said outer surface of the support, said lugs being arranged for reception, by flexure of the lugs, through the opening in the trim member upon pressing the member thereonto and arranged to reflx within the trim member for engaging the inner faces of the flanges to secure the member to the support.

3. A spring clip for securing to an apertured support a hollow trim member having an opening in one face with inturned flanges therealong, and comprising a single piece of spring metal having a portion in the form of a resilient shank for snapping into the aperture of the support, said shank having locking shoulders thereon for retaining the device in the aperture, and having widened portions in the form of lands for engagement with the outer face of the support adjacent the opening and having relatively narrow locking lugs extending from the upper edges of said widened portions toward the shank, said lugs being relatively narrow with respect to the widened portions and of such length as to terminate in spaced relation to the outer face of the support on which the clip is to be installed when the lands are in engagement with the outer face of the support, and said locking lugs being resilient and flexible relatively toward and away from each other for entry through the opening in the trim member when the trim member is pressed thereonto and for reflexing therein to secure the member to the support.

4. A spring clip for securing to an apertured support a hollow trim member having an opening in one face with inturned flanges therealong and comprising a single piece of spring metal having a snap fastening portion for snapping into an aperture of the support and having widened portions which are arranged to engage the outer face of the support when the clip is installed, and said widened portions having locking lugs thereon extending toward the shank and of such length as to terminate in spaced relation to the outer surface of the support when the clip is installed, said lugs being relatively narrow in relation to the shank, and said widened portions abutting each other at their free ends and said lugs being resilient and flexible toward and away from each other for reception through the opening in the member, upon pressing the member onto the clip.

5. A spring clip for securing to an apertured support a hollow trim member having an opening in one face with inturned flanges therealong and comprising a single piece of spring metal having a portion intermediate its ends in the form of resilient legs adapted for snap fastening engagement with the support through the aperture thereof, and having portions beyond the legs and which are widened laterally of the legs for engaging the outer face of the support on which the clip is to be installed, said widened portions abutting each other at their free ends and having locking lug portions thereon at their other ends extending outwardly and generally toward the legs and of such length as to terminate in spaced relation to the outer face of the support when the clip is installed, and said locking lug portions being resilient and adapted to flex toward each other for entering the opening of the trim member when the trim member is pressed thereonto, and adapted to reflex therein for engaging the flanges to secure the member to the support.

6. A spring clip for securing to an apertured support a hollow trim member having an opening in one face with inturned flanges therealong and comprising a single piece of spring metal having a portion intermediate its ends in the form of a nose and legs extending therefrom in spaced relation to each other partway of their length and having locking shoulders, and said piece of metal having portions widened laterally of the legs in the form of lands which are arranged to engage with the outer face of the support when the clip is installed, and said clip having relatively narrow locking lugs of less width than the legs and extending from said widened portions toward the legs and of such length as to terminate in spaced relation to the outer surface of the support when the clip is installed, and said locking lugs being resilient and flexible toward and away from the other whereby they may enter the opening in the member by pressing the trim member thereonto and reflex therein for engaging the flanges to secure the member to the support.

JOHN H. VAN UUM.